(12) United States Patent
Yanovsky et al.

(10) Patent No.: US 9,426,178 B1
(45) Date of Patent: Aug. 23, 2016

(54) METHOD AND APPARATUS FOR CENTRALIZED POLICY PROGRAMMING AND DISTRIBUTIVE POLICY ENFORCEMENT

(75) Inventors: Boris Yanovsky, Saratoga, CA (US); Roman Yanovsky, Los Altos, CA (US)

(73) Assignee: DELL SOFTWARE INC., Round Rock, TX (US)

( * ) Notice: Subject to any disclaimer, the term of this patent is extended or adjusted under 35 U.S.C. 154(b) by 3588 days.

(21) Appl. No.: 10/105,575

(22) Filed: Mar. 25, 2002

(51) Int. Cl.
G06F 15/173 (2006.01)
H04L 29/06 (2006.01)

(52) U.S. Cl.
CPC ...................... H04L 63/20 (2013.01)

(58) Field of Classification Search
USPC ................................. 709/224, 244
See application file for complete search history.

(56) References Cited

U.S. PATENT DOCUMENTS

| | | | |
|---|---|---|---|
| 5,968,176 A * | 10/1999 | Nessett et al. | 726/11 |
| 5,987,611 A | 11/1999 | Freund | |
| 6,510,466 B1 * | 1/2003 | Cox et al. | 709/229 |
| 6,601,082 B1 * | 7/2003 | Durham et al. | 718/100 |
| 6,708,187 B1 * | 3/2004 | Shanumgam et al. | 707/201 |
| 6,728,886 B1 | 4/2004 | Ji et al. | |
| 6,763,466 B1 | 7/2004 | Glover | |
| 6,799,197 B1 * | 9/2004 | Shetty et al. | 709/203 |
| 6,826,698 B1 | 11/2004 | Minkin et al. | |
| 6,880,005 B1 * | 4/2005 | Bell et al. | 709/225 |
| 7,010,807 B1 | 3/2006 | Yanovsky | |
| 2003/0055994 A1 | 3/2003 | Herrmann et al. | |
| 2003/0084331 A1 * | 5/2003 | Dixon et al. | 713/200 |

OTHER PUBLICATIONS

Sonicwall Ships Network Anti-Virus, Sonicwall Press Release dated Jun. 12, 2000, http://www.sonicwall.com/. . . /General/DisplayDetails.asp?id=42 (2 pgs).
Sonicwall Partners with Mycio.com to Deliver Anti-Virus Application Services, Sonicwall Press Release dated Feb. 22, 2000, http://www.sonicwall.com/. . . /General/DisplayDetails.asp?id=81 (3 pgs).
Bellovin, S., "Firewall-Friendly FTP," Network Working Group, RFC 1579, pp. 1-4, Feb. 1994.
Cisco Systems, Inc., "Cisco's PIX Firewall and Stateful Firewall Security," , http://www.cisco.com/warp/public/cc/pd/fw/sqfw500/tech/nat_wp.htm, pp. 1-9, Jun. 30, 2000.
Gaynor, M., Firewall Enhancement Protocol (FEP), Network Working Group, RFC 3093, pp. 1-11, Apr. 1, 2001.
Learn More About Viruses and Worms, Symantec AntiVirus Research Center (2 pgs).
Virus Descriptions, Virus Backgrounder, AntiVirus Research Center, Symantec United States, dated Dec. 5, 2000 (7 pgs).
Understanding Heuristics: Symantec's Bloodhound Technology, Symantec White Paper Series vol. XXXIV (14 pgs), Table of Contents (1 pg).
Lower IT Costs through Better Anti-Virus Management, A Symantec Corporate Solution (20 pges), Table of Contents (1 pg).
Understand and Managing Polymorphic Viruses, The Symantec Enterprise Papers vol. XXX (13 pgs), Table of Contents (1 pg).

* cited by examiner

*Primary Examiner* — Glenford Madamba
(74) *Attorney, Agent, or Firm* — Polsinelli LLP

(57) ABSTRACT

A method and apparatus for centralized policy programming and distributive policy enforcement is described. A method comprises centrally maintaining a plurality of policy definitions for one or more subscribers, generating policy configurations using the plurality of policy definitions, each of the policy configurations being specific to one of the plurality of policy definitions, and disseminating the policy configurations to the appropriate ones of the subscribers' networks.

36 Claims, 10 Drawing Sheets

METHOD AND APPARATUS FOR CENTRALIZED POLICY PROGRAMMING AND DISTRIBUTIVE POLICY ENFORCEMENT

BACKGROUND OF THE INVENTION

1. Field of the Invention

The invention relates to the field of computers. More specifically, the invention relates to policy enforcement.

2. Background of the Invention

Enforcing an anti-virus policy on an organization's network by maintaining an anti-virus program is a difficult task. The task is made difficult by constantly changing threats to an organization's network, software updates to the anti-virus program, and the distribution of host devices throughout the organization's network.

One method for maintaining a single anti-virus program of a single vendor in host devices of an organization's local area network (LAN) involves programming a choke point. A choke point monitors a number of host devices coupled to the choke point. The choke point is configured to enforce the organization's anti-virus policy. The host devices that do not have a current version of a single anti-virus program of a single vendor, that do not enable the single anti-virus program of the single vendor, or that do not have the single anti-virus program of the single vendor, are restricted from accessing the Internet through the choke point. If the host devices do not have the single anti-virus program of the single vendor or do not have the current version of the single anti-virus program of the single vendor, then the choke point retrieves components for installing or updating the single anti-virus of the single vendor from a predefined location. The choke point sends the retrieved components to the non-complying host devices.

The method of maintaining a single anti-virus program of a single vendor does not allow for the use of multiple anti-virus products by a single vendor, multiple anti-virus products by multiple vendors, or a single anti-virus product by multiple vendors. The method of maintaining a single anti-virus program of a single vendor also does not allow for the enforcement of a network policy defined for more than anti-virus protection of an organization's network. In addition, an administrator or similar person must configure each choke point for a particular anti-virus program. If an organization changes to a different vendor's anti-virus program, then someone must reconfigure each choke point throughout the organization's network with the new anti-virus program.

BRIEF SUMMARY OF THE INVENTION

A method and apparatus for centralized policy programming and distributive policy enforcement is described. According to one embodiment of the invention, a method provides for centrally maintaining a plurality of policy definitions for one or more subscribers, generating policy configurations using the plurality of policy definitions, each of the policy configurations being specific to one of the plurality of policy definitions, and disseminating the policy configurations to the appropriate ones of the subscribers' networks.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention.

In the description, the term network policy refers to a set of rules to be applied to an organization's network. A network policy may concern software configurations of host devices within the network or device configurations of host devices within the network. These software and/or hardware configurations may relate to external network external access, internal network external access, security requirements, license requirements, content filtering, virtual private networks, etc. Throughout the description, the term policy is used to refer to a network policy.

Figure 1:
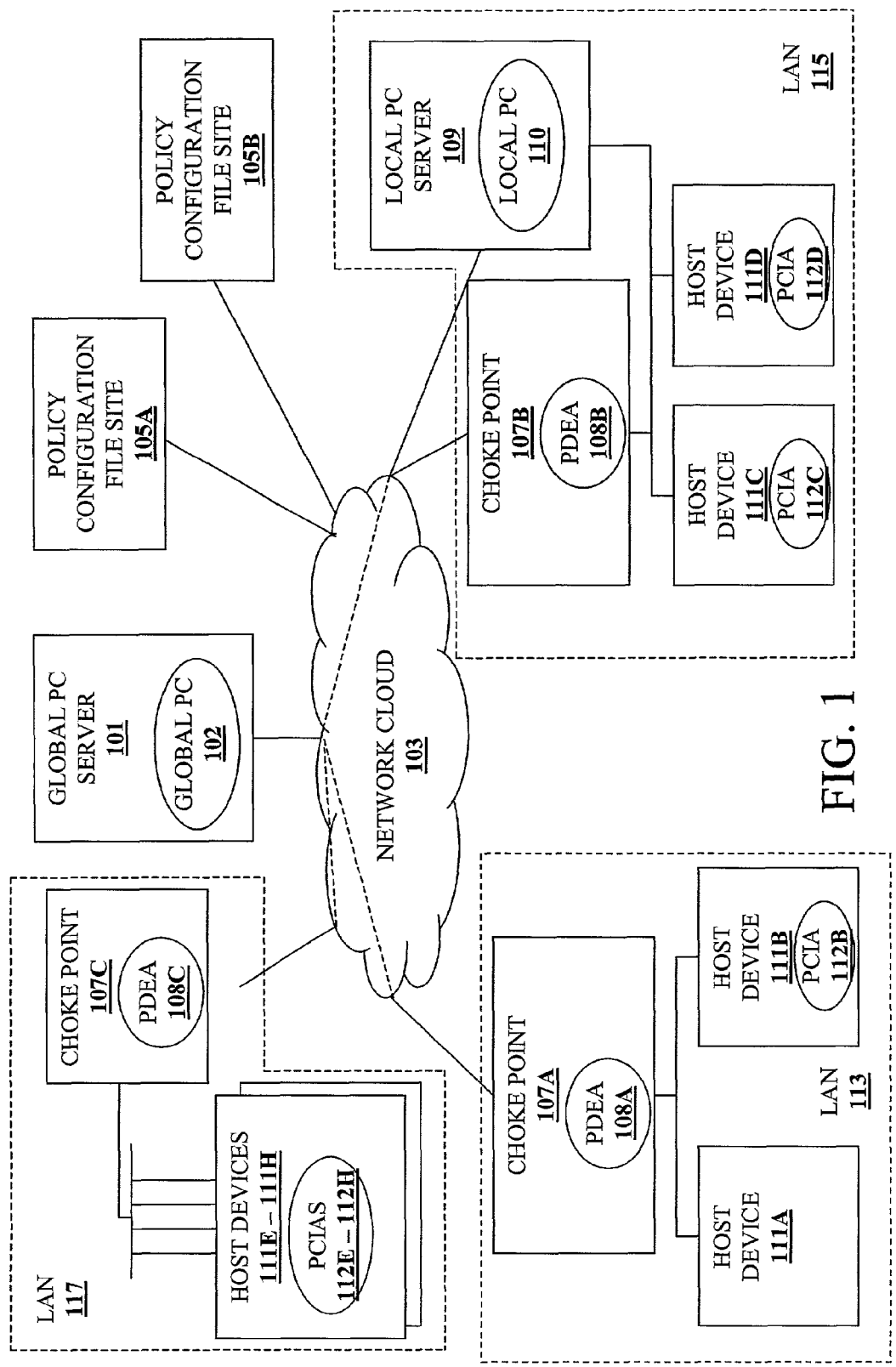
FIG. 1 is an exemplary diagram of a network with a distributive policy enforcement and centralized policy programming according to one embodiment of the invention.

FIG. 1 is an exemplary diagram of a network with a distributive policy enforcement and centralized policy programming according to one embodiment of the invention. In FIG. 1, a global policy coordinator server 101 is coupled with a network cloud 103. The network cloud 103 is coupled with policy configuration file sites 105A and 105B and local area networks (LANs) 113, 115, and 117. For this illustration, it is assumed that the LANs 113, 115, and 117 are each owned by different organizations, although different ownership scenarios may exist: LANs 113, 115, and 117 are owned by a single organization; LANs 113 and 117 are owned by a first organization and LAN 115 is owned by a second organization, etc.

The LAN 113 includes a choke point 107A, a host A, and a host device 111B. Within the LAN 113, the choke point 107A is coupled with the host devices 111A and 111B. The LAN 115 includes a local policy coordinator server 109, a choke point 107B, and host devices 111C and 111D. Within the LAN 115, the choke point 107B and the local policy coordinator server 109 are coupled with the host devices 111C-111D. The LAN 117 includes a choke point 107C, and host devices 111E-111H. Within the LAN 117, the choke point 107C is coupled with the host devices 111E-111H. A choke point is a point along the path to the external access point of a network or sub-network (e.g., a firewall, a VPN client, a VPN server, an SSL concentrator, modem, bridge, router, switch, etc.).

The global policy coordinator server 101 has a global policy coordinator 102. The local policy coordinator server 109 has a local policy coordinator 110. The choke points 107A-107C respectively have policy definition enforcement agents (PDEAs) 108A-108C. The host devices 111B-111H respectively have policy configuration implementation agents (PCIAs) 112B-112H. The host device 111A does not have a PCIA.

Policy coordinators use policy definitions to disseminate policy configurations to PCIAs and identify the disseminated policy configurations to PDEAs. The global policy coordinator 102 maintains policy definitions for one or more LANs of one or more subscribers. In contrast, the local policy coordinator 110 maintains one or more policy definitions for one or more networks of a single subscriber. Policy definitions are programmed into the global policy coordinator for multiple subscribers. In one embodiment of the invention, each subscriber remotely programs their policy into the global policy coordinator. In alternative embodiments of the invention, the entity that maintains the global policy coordinator programs policies into the global policy coordinator for subscribers. Such centralized policy programming enables efficient management of multiple policy definitions. Although, the local policy coordinator 110 maintains the policy definition(s) for a single subscriber, it still provides centralized policy programming albeit on a smaller scale.

Centralized policy programming also enables the efficient generation and dissemination of policy configurations from a central location. The global policy coordinator 102 maintains template configurations used to generate policy configurations based on policy definitions. Subscribers that program their policy definitions into the global policy coordinator 102 and subscribers that maintain their own policy definitions with local policy coordinators subscribe to the global policy coordinator to receive current policy configurations for their policy definitions. Subscriber's are able to rely on an entity that maintains the global policy coordinator 102 ("a policy enforcement service provider") to keep the template configurations up-to-date and disseminate policy configurations as indicated by the policy definitions. Hence, subscribers define their policy or change their policy, which typically occurs infrequently, while a policy enforcement service provider maintains template configurations and generates new policy configurations on behalf of the subscriber, which typically requires more frequent activity and resources.

In FIG. 1, the global policy coordinator 102 maintains policy definitions for the subscribers that own the LANs 113 and 117. The local policy coordinator 110 maintains a policy definition for the LAN 115. The global policy coordinator 102 generates policy configurations for the LANs 113 and 117 based on the appropriate policy definitions. The global policy coordinator 102 transmits appropriate ones of the generated policy configurations to the appropriate PCIAs. In particular with reference to FIG. 1, the global policy coordinator transmits policy configurations based on a policy definition for the LAN 113 to the PCIAs 112B, and a policy configuration based on a policy definition for the LAN 117 to the PCIAs 112E-112H. The global policy coordinator 102 does not transmit a policy configuration to the host device 111A because the host device 111A does not have a PCIA.

The local policy coordinator 110 requests template configurations from the global policy coordinator 102. The requested template configurations are based on the policy definition programmed into the local policy coordinator 110. The local policy coordinator 110 generates a policy configuration for the LAN 115 with the template configurations received from the global policy coordinator 102. The local policy coordinator transmits the generated policy configuration to the PCIAs 112C-112D.

The global policy coordinator 102 also transmits policy configuration identifiers that identify the transmitted policy configurations. In particular with reference to FIG. 1, the global policy coordinator 102 transmits: 1) a policy configuration identifier, which identifies the policy configuration transmitted to the PCIA 112B, to the PDEA 108A in the LAN 113; and 2) a policy configuration identifier that identifies the policy configuration transmitted to the PCIAs 112E-112H to the PDEA 108C in the LAN 117. For the LAN 115, the local policy coordinator 110 transmits a policy configuration identifier that identifies the policy configuration transmitted to the PCIAs 112C-112D.

The PDEAs 108A-108C use received policy configuration identifiers to enforce the policy definition for their LAN. The PDEAs 108A-108C enforce the policy definitions for their respective LANs by restricting external access of their LANs host devices that do not comply with their policy definition. A host device is not in compliance with its LAN's policy definition if 1) the host device does not have a PCIA, 2) the host device's PCIA does not have the policy configuration identified by the policy configuration identifier most recently received by the host device's governing PDEA, or 3) the host device's configuration status is inconsistent with the policy configuration identified by its PDEA.

A PCIA implements a received policy configuration on its host device. The PCIA communicates to its corresponding PDEA the identity of its most recently received policy configuration. The PCIA also reports its host device's configuration status to its PDEA. In FIG. 1, the PCIA 112B communicates with the PDEA 108A 1) to identify the policy configuration most recently received from the global policy coordinator 102, and 2) to report the configuration status of the host device 111B. The PCIAs 112E-112H communicate with the PDEA 108C 1) to identify the policy configuration most recently received from the global policy coordinator 102, and 2) to respectively report the configuration status of the host devices 111E-111H. The PCIAs 112C-112D communicate with the PDEA 108B 1) to identify the policy configuration most recently received from the local policy coordinator 110, and 2) to respectively report the configuration status of the host devices 111C-111D.

PDEAs and PCIAs may be implemented as software, hardware, or a combination of hardware and software. Although the PDEAs 108A-108C are illustrated in FIG. 1 as respectively residing on choke points 107A-107C, that are remote from the host devices 111A-111H, alternative embodiments may implement PDEAs on choke points that are directly connected to each of the host devices 111A-111H, or part of the host devices 111A-111H.

Distributively enforcing a policy ensures policy compliance for individual host devices within a network without burdening the owner of the network. Local choke points ensure that devices within its LAN comply with requisite policy definitions while a policy coordinator that is separate from the choke points carry out more complex functionality to ensure policy compliance. Centralized policy programming improves reliability of policy enforcement since the most current policy configurations are at a centralized location. Centralized policy programming also enables efficient programming of different LANs for an organization with either the same policy or different policies for the different LANs. In addition, centralized policy programming also unloads administrative tasks related to ensuring enforcement of an organization's network policy and updating a policy configuration onto a policy enforcement service provider. The policy enforcement service provider's resources can be dedicated to maintaining and disseminating policy information for multiple organizations, each having one or more LANs. Alternatively, the local policy coordinator enables an organization to define its policy with a higher level of granularity while still implementing a current policy configuration retrieved from the policy enforcement service provider.

Figure 2:
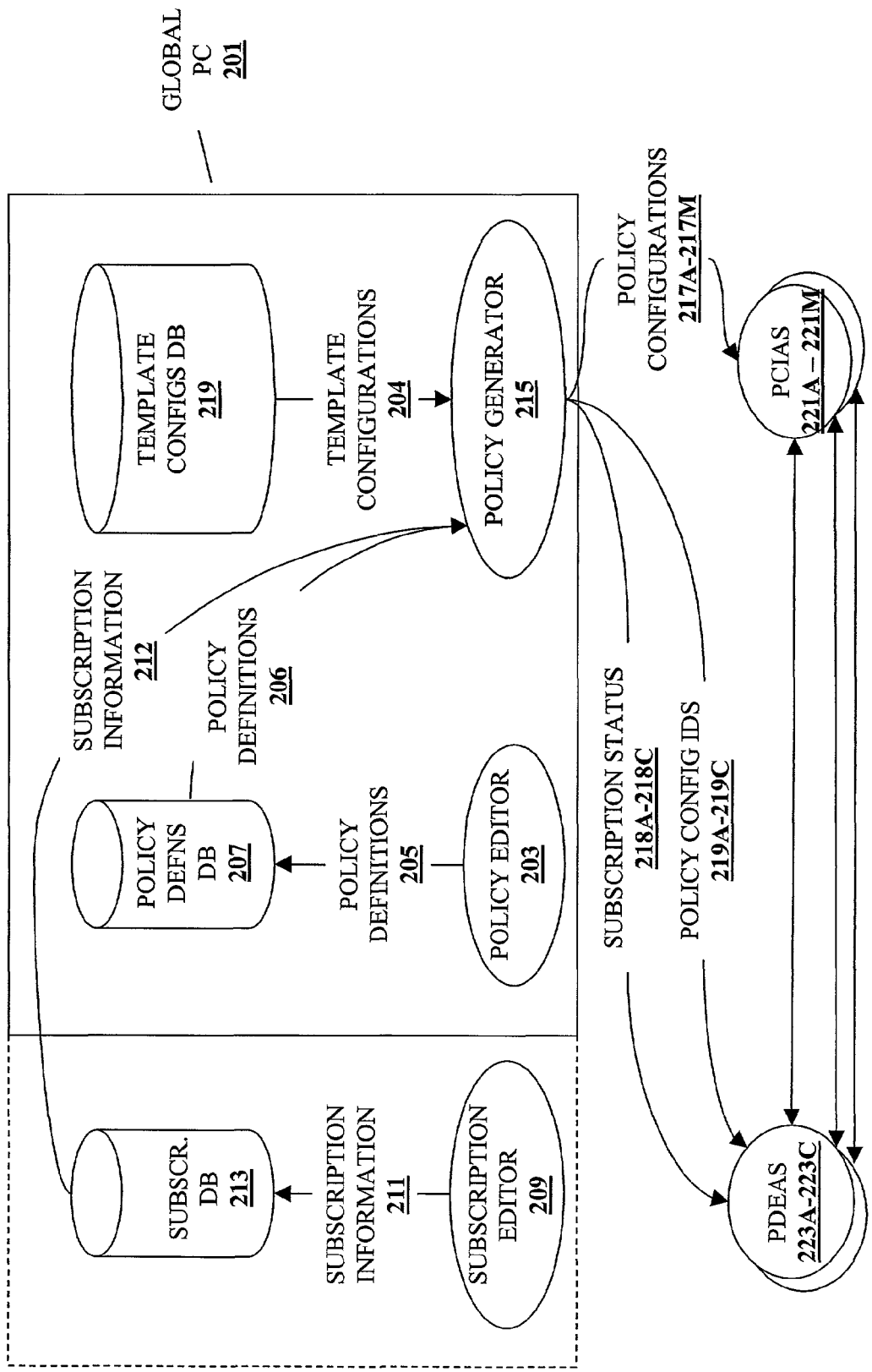
FIG. 2 is an exemplary diagram illustrating a global policy coordinator according to one embodiment of the invention.

FIG. 2 is an exemplary diagram illustrating a global policy coordinator according to one embodiment of the invention. In FIG. 2, a global policy coordinator 201 includes a policy editor 203, a policy definitions database 207, a policy generator 215, and a template configurations database 219. The global policy coordinator 201 may optionally include a subscription editor 209 and a subscription database 213. Alternative embodiments of the invention may implement the global policy coordinator 201 in a variety of different ways (e.g., the subscription editor 209 and the subscription database 213 may be a module separate from the global policy coordinator 201 but within the same server, the subscription editor 209 and the subscription database 213 may be a separate module in a separate server, the subscription editor 209 may be part of the global policy coordinator 201 and the subscription database may be in a separate server, the policy editor 203 and the policy generator 215 may be located on one server while the policy definitions database 207 and the template configurations database 219 are on one or more different servers, etc.).

The subscription editor 209 receives and stores subscription information 211 in the subscription database 213. The subscription information 211 may be entered by a user, read from a file, received from a remote location, etc. The subscription information 211 indicates the subscription status of subscribers with respect to a variety of services including policy enforcement. A policy is defined with the policy editor 203. The policy editor 203 stores policy definitions 205 in the policy definitions database 207. A given one of the policy definitions 205 may be defined from a remote location, may be directly defined by a user at a global policy coordinator server, etc.

Figure 3:
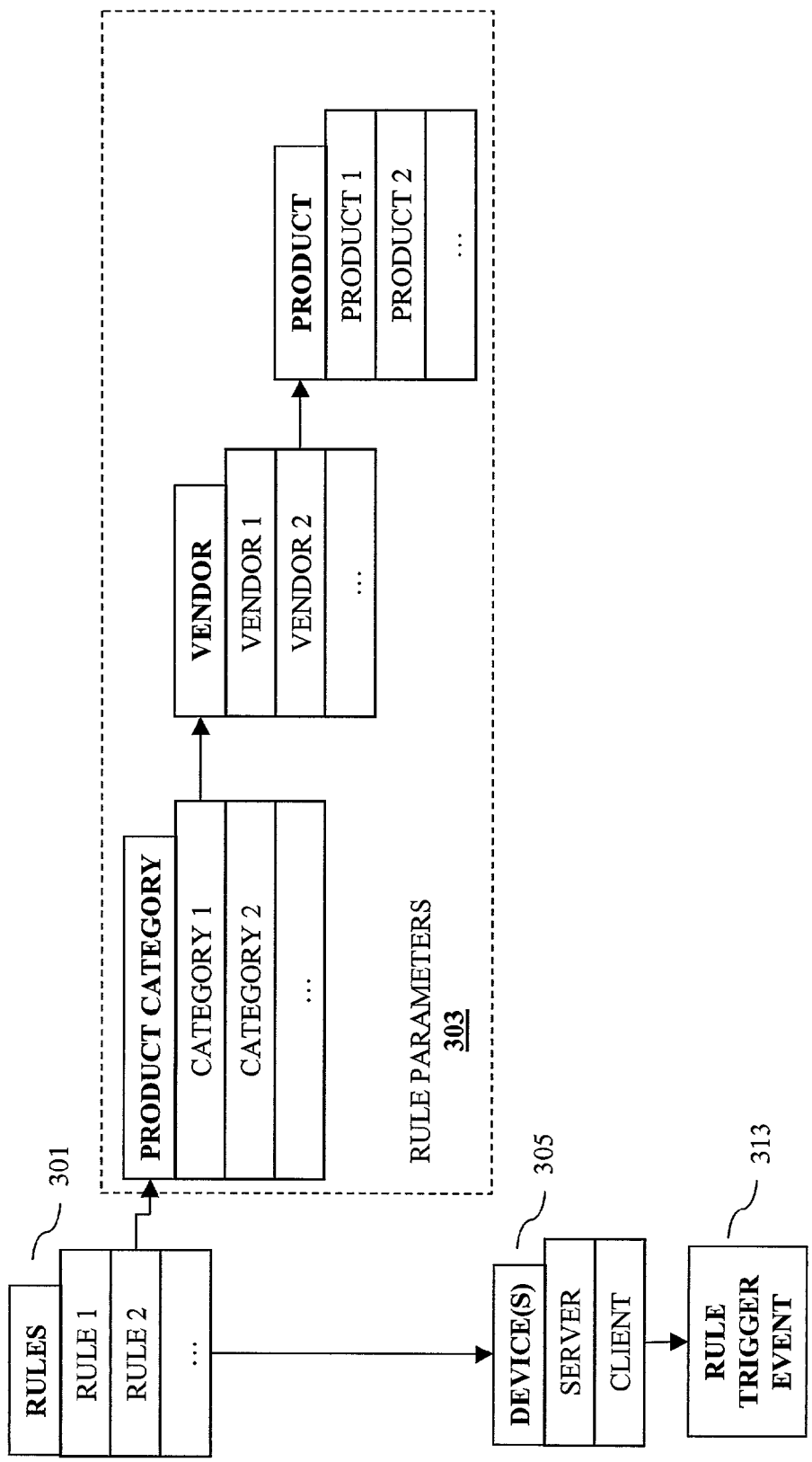
FIG. 3 is an exemplary diagram of policy parameters for generating a policy definition according to one embodiment of the invention.

FIG. 3 is an exemplary diagram of policy parameters for generating a policy definition according to one embodiment of the invention. In FIG. 3, a first policy parameter 301 indicates a set of possible rules. One or more of the rules may be selected for a policy definition. Some exemplary rules include maintaining software, disallowing software, software license compliance, content filtering, anti-virus protection, maintain security patches, etc. A selected rule includes rule parameters 303. The number of rule parameters and the complexity of the rule parameters may vary between different rules. The rule parameters 303 include, for example, product category, vendor, and product as illustrated in FIG. 3. The dependencies between rule parameters may vary depending upon implementation. For example, one or more of the product category rule parameters may depend on the vendor rule parameter instead of the vendor rule parameter being dependent on the product category rule parameter as illustrated in FIG. 3. Alternatively, rule parameters may be independent of the selected rule. The number and type of rule parameters may vary across alternative embodiments of the invention. In addition, the variability of each rule parameter may vary across different embodiments of the invention. In FIG. 3, the vendor rule parameter lists a number of possible vendors. Alternative embodiments of the invention may limit the vendor rule parameter to a single vendor. Furthermore, certain rules, such as a rule that restricts access to certain sites on the Internet, may be specified to be implemented by a PDEA instead of a PCIA or both the PCIA and the PDEA.

A second policy parameter 305 indicates a device(s) upon which the selected rule is to be applied. In FIG. 3, the second policy parameter 303 indicates a set of one or more types of devices, client or server, upon which the selected rule(s) is to be applied. The type of device may be selected based on machine name, operating system, etc. In alternative embodiments of the invention, the second policy parameter 303 indicates a list of network addresses (e.g., MAC addresses, IP addresses, etc.). The administrator can select one or more of the network addresses of devices upon which the selected rule(s) is to be applied.

A third policy parameter 313, rule trigger event, defines what will cause a policy coordinator to generate a policy configuration for the policy definition that includes the selected rule(s) ("an unconditional rule trigger event") or what will cause a policy coordinator to make a determination of whether a policy configuration should be generated for the policy definition that includes the selected rule(s) ("a conditional rule trigger event"). The third policy definition parameter 313 may be a time period, frequency of network events, user prompted events, detection of a policy definition violation, etc. In another embodiment of the invention, the trigger for a selected rule is specified for the PCIA, the PDEA, policy coordinator, or a combination of them. For example, the trigger for restricting software is defined for the PCIA. The trigger for updating software is defined for both the PCIA and the policy coordinator. A subscriber may designate the policy parameters illustrated in FIG. 3 at a local policy coordinator server, through remotely logging in to the policy editor of a global policy coordinator, etc.

To provide an example, in one embodiment, assume a policy for a LAN is defined to include anti-virus protection. The anti-virus protection rule is defined for one or more different anti-virus products made by one or more different anti-virus product vendors. The policy definition may include additional rules. A security patches rule is defined for certain programs (i.e., which programs must have the most current security patches) and the number of days in a period to check for the most current security patches. A disallowed programs rule is defined for one or more certain programs. A content filtering rule is defined with disallowed URLs, configuration gradients of an Internet browser, and/or rated websites. A licensing rule is defined with a license key. These examples are meant to aid in the understanding of the invention and not meant to be limiting upon the invention.

Returning to FIG. 2, the policy generator 215 retrieves subscription information 212 from the subscription database 213 and policy definitions 206 from the policy definitions database 207 in response to one or more triggers as defined in a policy definition. Additional triggers include expiration of a time period, receipt of the policy definition, renewal of a subscription, modifications to the template configurations database, a refresh request from a PDEA, a request from a local policy coordinator, etc. For example, a policy definition includes a rule to maintain software with a trigger defined as every 48 hours. The trigger for the policy generator 215 to retrieve the policy definition to generate a corresponding policy configuration is the initial programming of the policy definition, and every 48 hours after the initial programming. In alternative embodiments of the invention, agents within the policy definitions database 207 push a policy definition in response to triggers. For example, when a policy definition is initially stored in the policy definitions database 207, the agents monitoring the policy definitions database 207 push the policy definition to the policy generator 215. Subsequent to the initial storing of the policy definition, the agents monitoring the policy definitions database 207 push the policy definition to the policy generator 215 every 48 hours.

The policy generator 215 collects template configurations 204 from the template configurations database 219 in accordance with the policy definitions 206 and the subscription information 212, and generates policy configurations 217A-217M. The policy generator 215 may collect template configurations and generate a policy configuration in response to a trigger event occurring, depending on whether the trigger event is conditional or unconditional. When an unconditional trigger event occurs, the policy generator collects template configurations and generates a policy configuration. When a conditional trigger event occurs, the policy generator collects template configurations and generates a policy configuration after a determination is made that the policy generator should collect the template configurations and generate the policy configuration. A trigger event may be any of the following types of trigger events: a conditional coordinator trigger event, an unconditional coordinator trigger event, a conditional rule trigger event, an unconditional rule trigger event, a conditional policy definition trigger event, or an unconditional policy definition trigger event.

A coordinator trigger event is a trigger event defined for the coordinator by the entity managing the policy coordinator. For example, an administrator defines a conditional coordinator trigger event to be detection of modification to the template configurations database. When the template configurations database is modified, the policy coordinator determines if any policy definitions are affected and generates policy configurations for those policy definitions that are affected. As another example, the administrator of the policy coordinator defines an unconditional coordinator trigger event to be the programming of a new policy definition into the policy definitions database or modification of a policy definition currently in the policy definitions database. Whenever a new policy definition is programmed or current policy definition is modified, the policy generator collects template configurations for the policy definition and generates a policy configurations for it. A rule trigger event has been described with reference to FIG. 3. A policy definition trigger event is an event defined for a policy definition. For example, a subscriber's administrator may define an unconditional policy definition trigger event to be the lapse of a time period. Once the time period lapses, the policy generator collects template configurations for the policy definition and generates a corresponding policy configuration. Various inter-trigger rules may also be established to supersede certain trigger events. For example, although a subscriber defines an unconditional policy trigger event as the lapse of 24 hours, an administrator of a policy coordinator may define an inter-trigger rules that blocks the generation of a policy configuration in response to an unconditional policy trigger event to avoid taxing resources of the system hosting the policy coordinator. The template configurations in the template configurations database 219 may be maintained by an administrator, entered by an administrator and maintained by a script or program, etc.

Certain embodiments include mechanisms to avoid the transmission of policy configurations when not necessary. In one embodiment of the invention, a log is maintained, for example by the policy generator 215. The log tracks the most recent policy configuration generated for each subscriber. If the policy generator 215 generates a new policy configuration for a subscriber that is the same as the previously generated policy configuration for that subscriber, then the generated policy configuration is not transmitted. In another embodiment of the invention, a flag is maintained in addition or instead of the log. The flag indicates whether any modifications have been made on the template configurations database 219. If the flag indicates that no modification has been made on the template configurations database 219 and if the policy definition is not newly programmed into the global policy coordinator 210, then the policy generator 215 will not retrieve template configurations from the template configurations database 219.

At a given time, the template configurations 204 collected from the template configurations database 219 will correspond to a policy definition and subscriber information for a given subscriber. The policy generator 215 will also generate policy configuration identifiers for each policy configuration that is generated.

The policy generator 215 transmits subscription status 218A-218C and policy configuration identifiers 219A-219C to PDEAs 223A-223C. The policy generator 215 also transmits policy configurations 217A-217M to PCIAs 221A-221M. If the PDEAs 223A-223C belong to the same subscriber and are to enforce the same policy definition, then the policy configurations 217A-217M are the same policy configurations and are transmitted at the same time or at approximately the same time. Likewise, the policy configuration identifiers 219A-219C and subscription status 218A-218C are the same if the PDEAs 223A-223C belong to the same subscriber and are to enforce the same policy. If the PDEAs 223A-223C belong to different subscribers and/or are enforcing different policies, then policy configurations 217A-217M will correspond to the appropriate policy definitions, the subscription status 212 will correspond to the appropriate subscribers, the policy configuration identifiers 219A-219C will correspond to the appropriate policy configurations, and the times of transmission are independent. While in one embodiment the policy configurations 217A-217M each include their policy configuration identifier, in alternative embodiments they do not and the policy generator 215 also transmits policy configuration identifiers to the PCIAs 221A-221M.

The policy generator 215 may not retrieve those of the policy configurations 217A-217M that correspond to a subscriber without a current subscription. Various embodiments may implement different techniques to ensure subscription maintenance. In one embodiment, the policy generator 215 transmits a subscription status to a PDEA and waits until the subscriber's subscription is made current. In an alternative embodiment of the invention, the policy generator 215 transmits a subscription status and a policy configuration identifier to a PDEA and a policy configuration to a PCIA. If the subscriber's subscription information is not updated within a period of time indicated by the policy generator 215 or previously defined at the PDEA, then the PDEA may either prevent traffic from flowing through it or stop monitoring traffic. In another embodiment of the invention, the policy generator 215 transmits a message to a subscriber to inform the subscriber that their subscription has expired while continuing to perform policy coordination and enforcement.

Figure 4:
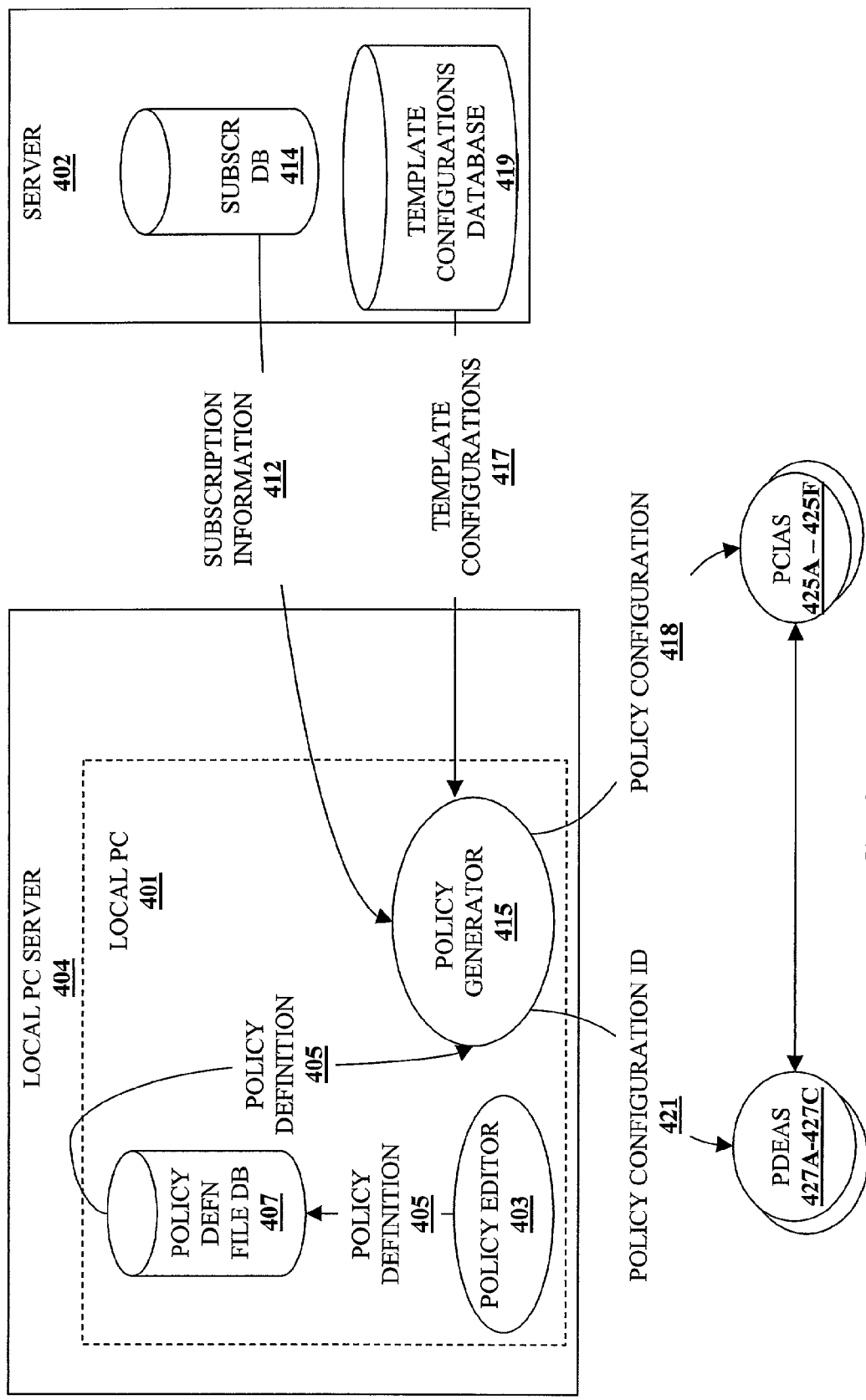
FIG. 4 is an exemplary diagram illustrating a local policy coordinator according to one embodiment of the invention.

FIG. 4 is an exemplary diagram illustrating a local policy coordinator according to one embodiment of the invention. In FIG. 4, a local policy coordinator 401 includes a policy editor 403, a policy definitions database 407, and a policy generator 415. The policy editor 403 receives parameters, generates a policy definition 405, and stores the policy definition 405 in the policy definitions database 407, similar to the policy editor 203 of FIG. 2, but the policy definitions database 407 includes policy definitions for a single subscriber. In an alternative embodiment, the local policy coordinator only maintains a single policy definition and does not include a policy definition database. In FIG. 4, a server 402 includes a subscription database 414 and a template configurations database 419. In one embodiment of the invention, the server 402 is similar to the global policy coordinator server 101 illustrated in FIG. 1 and has all of the components of a global policy coordinator similar to the global policy coordinator 201 illustrated in FIG. 2. In an alternative embodiment of the invention, the template configurations database 419 and the subscription database 414 are not located on a global policy coordinator server. Instead, the template configurations database 419 and the subscription database 414 are implemented on a server for maintaining subscription information and template configurations for subscribers utilizing local policy coordinators so that one set of servers transmits subscription information and policy configurations while another set of servers transmits template configurations and subscription information. In another embodiment of the invention, the template configurations database 419 and the subscription database 414 are implemented on separate servers. For example, a policy enforcement service provider maintains subscription information for all subscribers on one server while maintaining a global policy coordinator on another server and a template configurations database for subscribers utilizing a local policy coordinator on yet another server.

The policy generator 415 retrieves the policy definition 405 from the policy definitions database 407 and subscription information 412 from a subscription database 414. The policy generator 415 collects template configurations 417 from the template configurations database 419 in accordance with the policy definition 405 and the subscription information 412. The policy generator 415 may be blocked from retrieving the template configurations 417 if the subscriber that manages the local policy coordinator 401 has not made its subscription current. As previously described, the policy generator 415 may have a time period to access the template configurations database 419 until external access is blocked if the subscription is not made current. The local policy coordinator 401 may also ensure that the subscriber's subscription is made current as described with reference to the global policy coordinator 201 of FIG. 2.

Similar to the policy generator 215 of FIG. 2, the policy generator 415 generates a policy configuration identifier 421 and communicates the policy configuration identifier 421 to PDEAs 427A-427C. The policy generator 415 also generates a policy configuration 418 from the collected template configurations 417 and communicates the policy configuration 418 to PCIAs 425A-425F. As previously described, while in one embodiment the policy configuration 418 includes the policy configuration identifier 421, in another embodiment it does not and the policy generator 415 transmits the policy configuration identifier 421 to the PCIAs 425A-425F.

In alternative embodiments of the invention, a policy coordinator (either local or global) transmits more than a policy configuration identifier to a PDEA. For example, the policy coordinator may transmit a list of restricted sites to the PDEA. The PDEA can then prevent access to the restricted sites.

With centralized policy programming and distributed policy enforcement, a subscriber need only to define its policy in order for the policy to be enforced upon the subscriber's network. A policy enforcement service provider maintains template configurations and updates the policy configurations for the defined policy. Centralized policy programming enables a policy enforcement service provider to efficiently generate policy configurations for multiple subscribers. Centralized policy programming also allows scalability of programming a policy. A single policy generator can disseminate a policy configuration and policy configuration identifier to any number of LANs instead of a system administrator configuring each choke point for the LANs.

Figure 5:
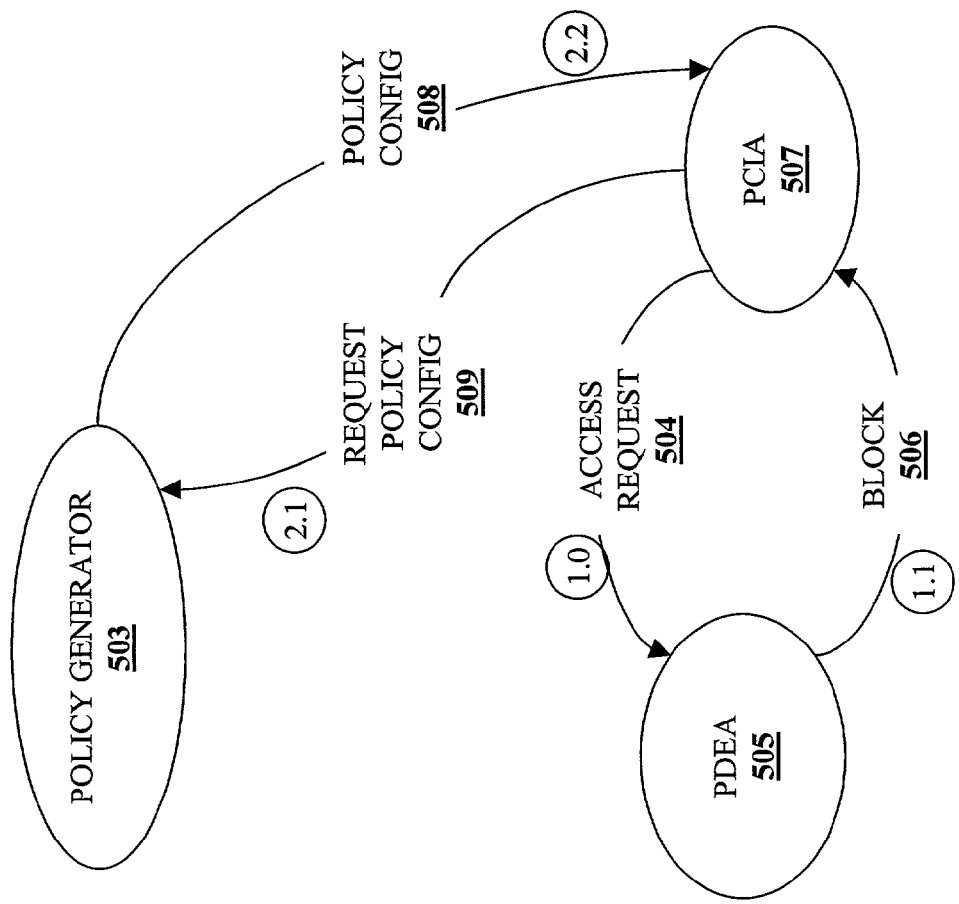
FIG. 5 is an exemplary diagram of communications between a PDEA and PCIA regarding policy definition compliance according to one embodiment of the invention.

FIG. 5 is an exemplary diagram of communications between a PDEA and PCIA regarding policy definition compliance according to one embodiment of the invention. In FIG. 5, at a time 1.0, a PCIA 507 transmits an external access request 504 to gain external access beyond a PDEA 505. If the PDEA 505 determines that the PCIA's 507 host device is not in compliance with a current policy definition, then at a time 1.1, the PDEA 505 communicates a block illustrated as line 506 to the PCIA 507. The PDEA 505 will block the PCIA's 507 host device if either 1) the current policy configuration identifier of the PDEA 505 does not match the PCIA's 507 current policy configuration identifier, or 2) the PCIA 507 reports that its host device's configuration status is not consistent with the current policy configuration identified by the PDEA 505 and the PCIA 507.

If the block 506 results from the PCIA's 507 current policy configuration identifier not matching the PDEA's 505 current policy configuration identifier, then the PCIA 507 attains a current policy configuration from a policy generator 503, illustrated as line 509, by requesting a current policy configuration at a time 2.1. At a time 2.2, the PCIA 507 receives a current policy configuration, illustrated as line 508, from the policy generator 503. Alternatively, the PCIA 507 attains the policy generator's 503 current policy configuration by retrieving the policy generator's 503 policy configuration. If the block 506 results from the PCIA 507 reporting that its host device's configuration status is not consistent with the current policy configuration identified by the PCIA 507 and the PDEA 505, then the PDEA 505 maintains the block until the PCIA 507 reports that its host device's configuration status is consistent with the policy configuration. Communications between the PDEA 505 and the PCIA may be network communications, inter-process communications within a single device, or bus communications between different devices or cards coupled to a host device.

Figure 6:
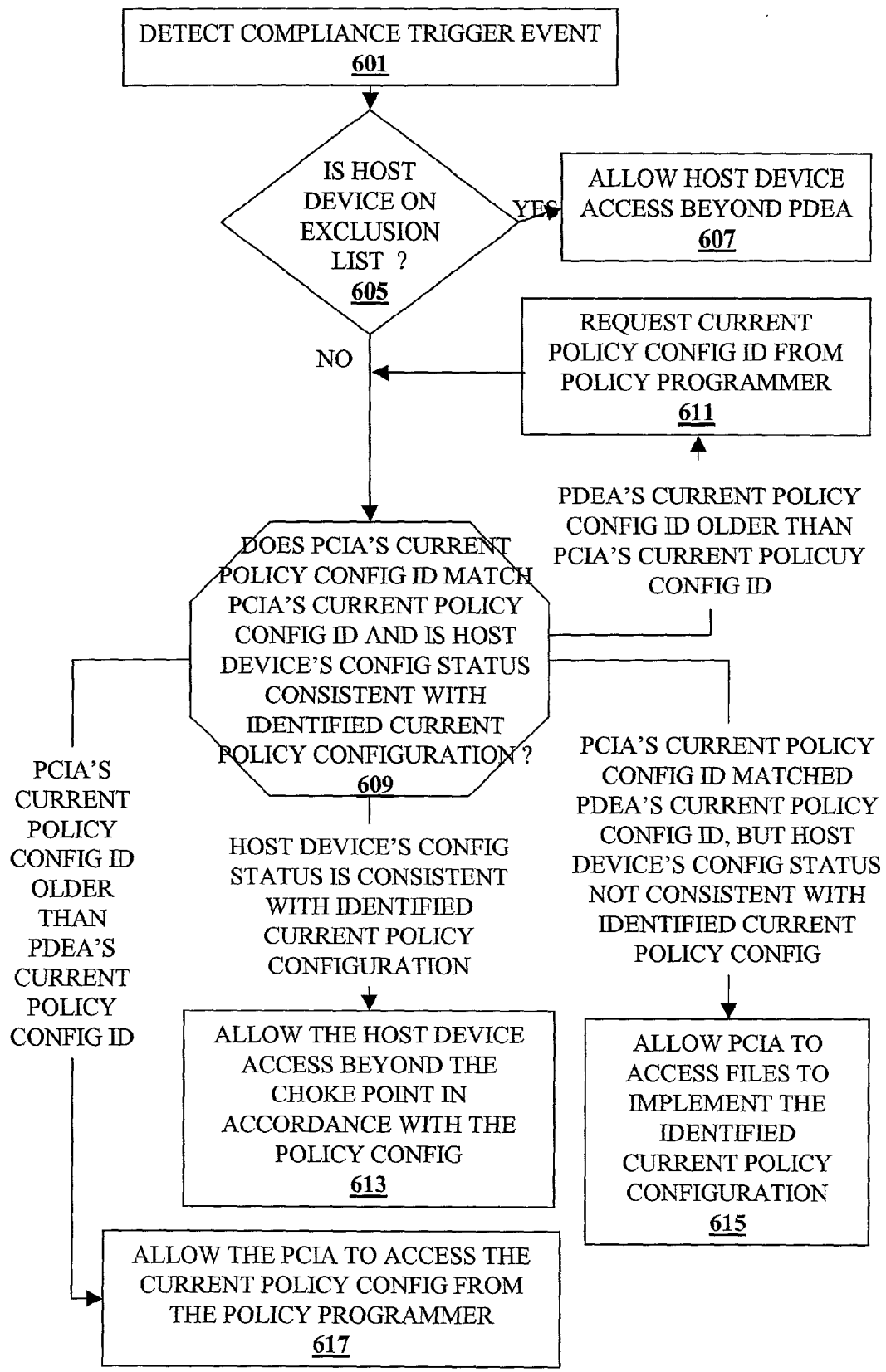
FIG. 6 is an exemplary flowchart for a PDEA to enforce a policy definition according to one embodiment of the invention.

FIG. 6 is an exemplary flowchart for a PDEA to enforce a policy definition according to one embodiment of the invention. At block 601, a compliance trigger event is detected. A compliance trigger event may be an external access request from a PCIA, lapse of a time period, prompt from a user, receipt of a policy configuration identifier from a policy coordinator, etc. that causes the PDEA to enforce its policy definition. At block 605, it is determined if a host device is on an exclusion list. If the host device is on an exclusion list, then control flows to block 607. If the host device is not on an exclusion list, then control flows to block 609. The exclusion list identifies host devices that do not have to comply with the policy definition corresponding to the exclusion list. The exclusion list may identify host devices by machine names, MAC addresses, IP addresses, etc. It is implied that the exclusion list to be applied by a PDEA corresponds to the policy configuration identifier received by the PDEA. Alternatively, a policy configuration that corresponds to an exclusion list may be indicated in the exclusion list (e.g., identified with the policy configuration identifier, linked to the policy configuration, etc.).

At block 607, the host device is allowed external access beyond the PDEA.

At block 609, it is determined if the PCIA's current policy configuration identifier matches the PDEA's current policy configuration identifier and if the host device's configuration status is consistent with the currently identified policy configuration.

If the PDEA's current policy configuration identifier is older than the PCIA's current policy configuration identifier, (e.g., the PCIA has received a policy generator's current policy configuration identifier but the PDEA has not received the policy generator's current policy configuration identifier), then control flows to block 611. Policy configuration identifiers can be compared with different techniques. For example, if the policy configuration identifiers are version numbers, then the lower version number is the older policy if version numbers are sequential. If policy configuration identifiers are time stamps, then the older policy configuration identifier will be identified by the older time stamp. At block 611, the policy generator's current policy configuration identifier is requested from the policy coordinator. From block 611 control flows to block 609.

If at block 609 it is determined that the PCIA's current policy configuration identifier does not match the PDEA's current policy configuration identifier, then control flows to block 617. At block 617, the PCIA is allowed to externally access the policy generator's current policy configuration. The PDEA will permit the PCIA to externally access a network address of the device hosting the policy generator. The address may be present upon installation of the PDEA, entered by a system administrator, etc.

If at block 609 it is determined that the PCIA's current policy configuration identifier matches the PDEA's current policy configuration identifier, but the PCIA reports that its host device's configuration status is not consistent with the identified current policy configuration, then control flows to block 615. The PCIA may report its host device's configuration status with different techniques. In one embodiment, the PCIA transmits a flag that indicates whether its host device's configuration status is consistent or inconsistent with the identified current policy configuration. The flag may be transmitted with the PCIA's current policy configuration identifier, in response to a request from the PDEA, after the PDEA determines a match between the PDEA's current policy configuration identifier and the PCIA's current policy configuration identifier, etc. In an alternative embodiment of the invention, the PCIA transmits a report instead of a flag that indicates whether the PCIA's host device's configuration status is consistent with the identified current policy configuration. At block 615, the PCIA is allowed to externally access network addresses where files for the host device to implement the identified current policy configuration are maintained. In one embodiment of the invention, these network addresses are indicated in the policy configuration. In alternative embodiments of the invention, the network addresses may be initially installed with the PDEA and updated by the policy generator, entered and updated by a system administrator of the policy enforcement service provider, etc. In an alternative embodiment of the invention, the policy configuration includes the files.

If at block 609 it is determined that the host device's configuration status is consistent with the identified current policy configuration, then control flows to block 613. At block 613, the host device is allowed external access beyond the PDEA in accordance with the identified current policy configuration.

Figure 7:
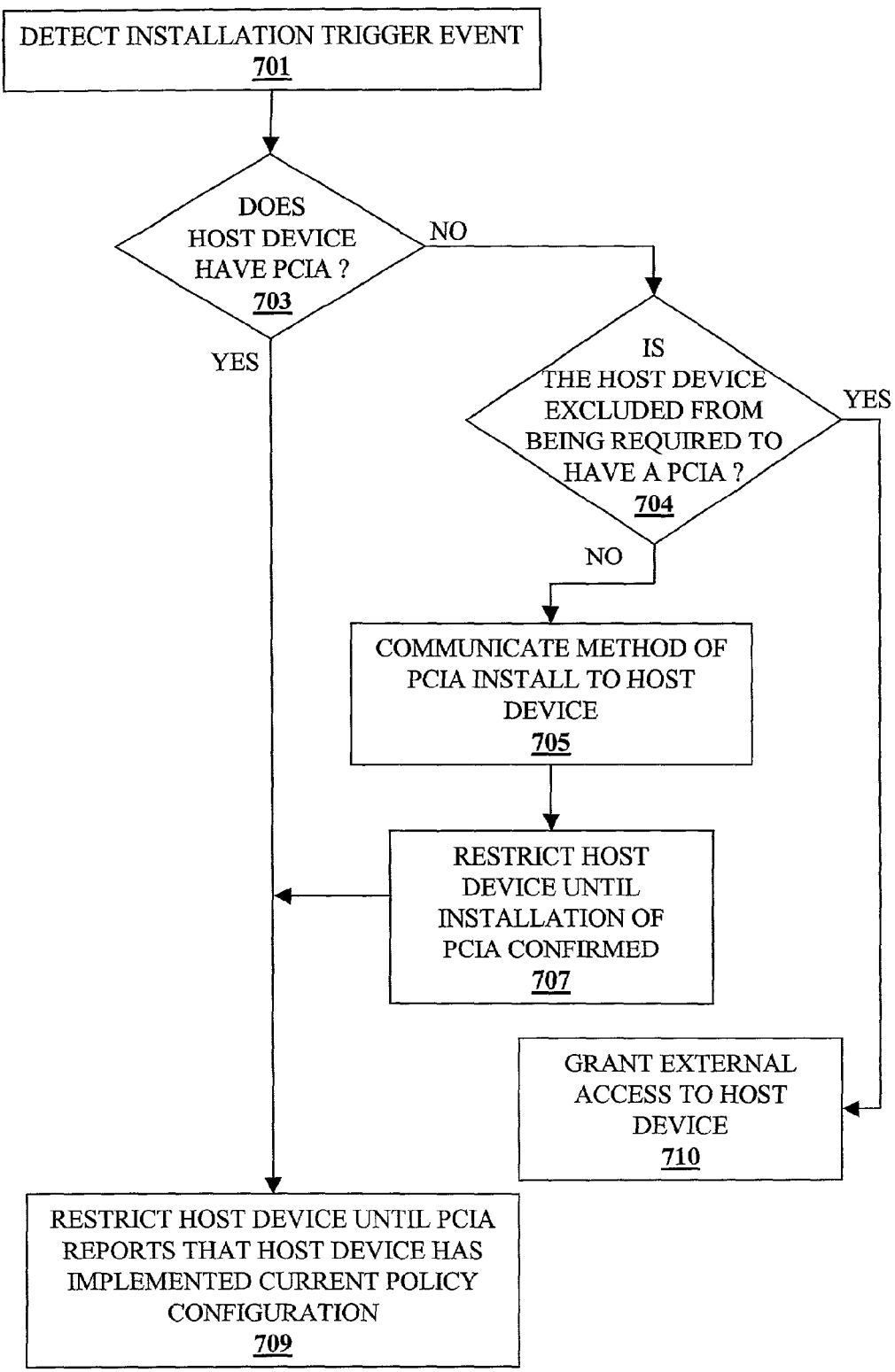
FIG. 7 is an exemplary flow chart for a PDEA to enforce PCIA installation onto a host device according to one embodiment of the invention.

FIG. 7 is an exemplary flow chart for a PDEA to force PCIA installation onto a host device according to one embodiment of the invention. At block 701, an installation trigger is detected. The installation trigger may be detected in a variety of manners including power up of a host device on a network, addition of a host device to a local area network, etc. At block 703, it is determined if the host device has a PCIA. If the host device does not have a PCIA, then control flows to block 704. If the host device has a PCIA, then control flows to block 709.

At block 704, it is determined if the host device is excluded from being required to have a PCIA. If the host device is excluded from being required to have a PCIA then control flows to block 710. If the host device is not excluded from being required to have a PCIA, then control flows to block 705.

At block 710, the host device is granted external access.

At block 705, a method of installing the PCIA is communicated to the host device's user. At block 707, the host device's external access is restricted until PCIA installation is confirmed. From block 707 control flows to block 709. At block 709, the host device is restricted from external access until its PCIA indicates that the host device complies with current policy configurations.

While the flow diagrams in the Figures show a particular order of operations performed by certain embodiments of the invention, it should be understood that such order is exemplary (e.g., alternative embodiments may perform certain of the operations in a different order, combine certain of the operations, perform certain of the operations in parallel, etc.).

For example, in one embodiment block 615 does not have to gain external access beyond the PDEA if the subscriber maintains files locally for implementing a policy configuration. In one embodiment of the invention, the subscriber maintains files as directed by a global policy coordinator for implementing the identified current policy configuration. In another embodiment of the invention, block 611 is not performed because a policy configuration will not be transmitted to a PCIA until the PDEA for the PCIA has acknowledged receipt of the most current policy configuration identifier from the policy generator. Blocks 605 and 607 may also be performed differently. Although a host device is identified in an exclusion list, an alternative policy definition may be enforced on all host devices identified on the exclusion list. Blocks 605 and 607 are not performed if exclusions lists are not implemented.

The operations identified in FIG. 7 may also be performed differently. In one embodiment, host devices cannot be excluded from being required to have a PCIA. In an alternative embodiment of the invention, block 707 is not performed because a host device without a PCIA is restricted for a given time period. After the time period, the PDEA checks the host device again to determine if the PCIA has been installed. Alternatively, the user is given the option to install the PCIA for a time period. Upon expiration of the time period, the host device's external access is restricted until the PCIA is installed. The user may also be given the option to immediately install the PCIA. If the user selects not to install the PCIA, then the host device's external access is immediately restricted until the PCIA is installed.

Figure 8:
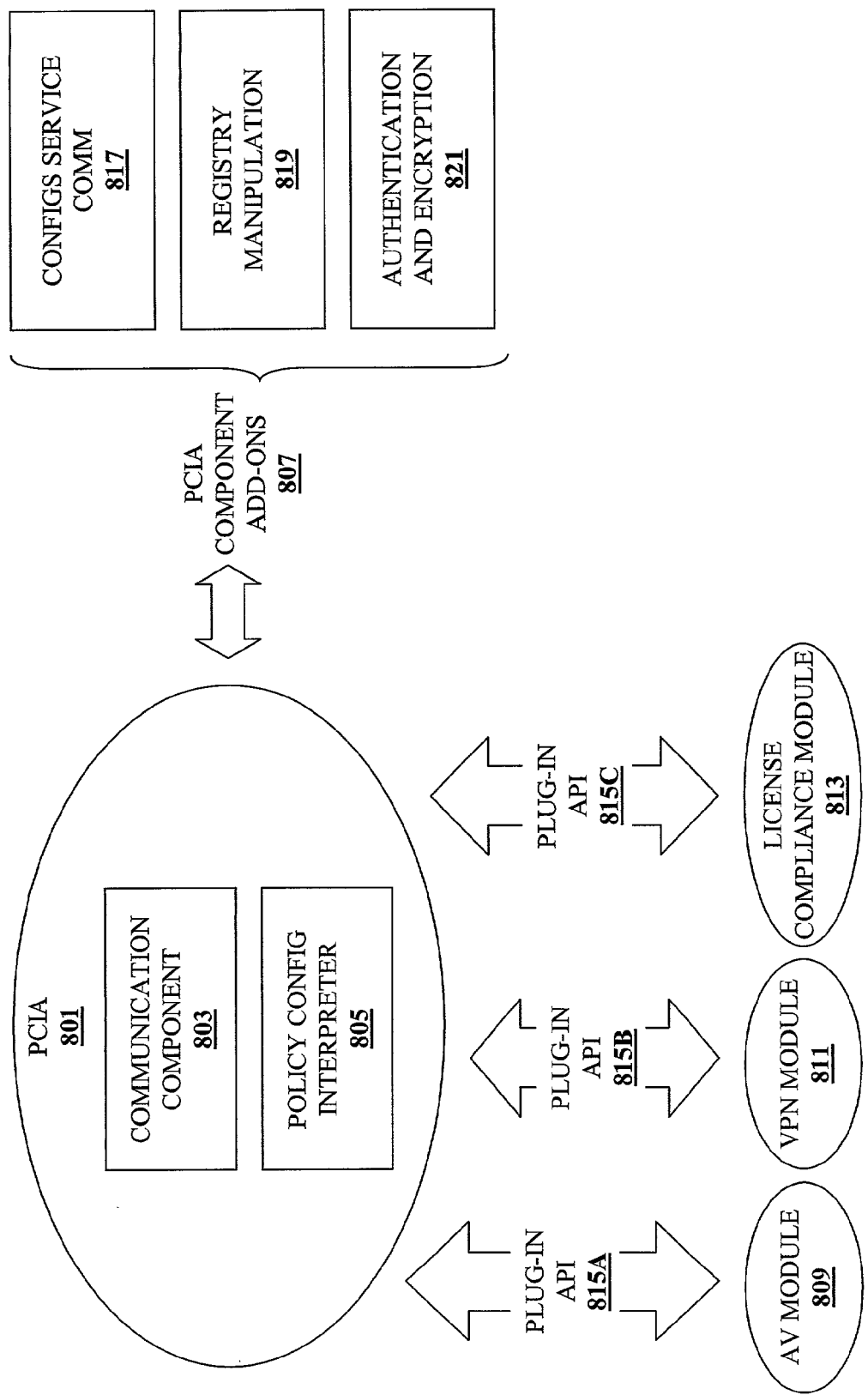
FIG. 8 is an exemplary diagram of a PCIA according to one embodiment of the invention.

FIG. 8 is an exemplary diagram of a PCIA according to one embodiment of the invention. In FIG. 8, a PCIA 801 includes a communication component 803 and a policy configuration interpreter 805. The PCIA 801 communicates with a PDEA and a policy coordinator with the communication component 803. The PCIA 801 parses policy configurations received from a policy coordinator with the policy configuration interpreter component 805. Functionality can be added to the PCIA 801 with PCIA component add-ons. In FIG. 8, exemplary PCIA component add-ons 807 are illustrated. The PCIA component add-ons 807 include a configuration service communication component 817, a registry manipulation component 819, and an authentication and encryption component 821. The registry manipulation 819 enables the PCIA 801 to scan and manipulate the registry of its host device with the registry manipulation component 819, in order to detect restricted software for example. In addition, the PCIA 801 can perform authentication and encryption with the authentication and encryption component 821. The authentication and encryption component 821 may enable the PCIA to authenticate and encrypt messages passed between the PCIA and the PDEA and/or policy generator, to implement a certain level of encryption and authentication on its host device, etc.

The PCIA 801 can implement certain aspects of a policy configuration with application programming interfaces (API). FIG. 8 illustrates an anti-virus (AV) module 809, a VPN module 811, and a license compliance module 813. The plug-in APIs 815A-815C will respectively enable the PCIA 801 to implement AV aspects of a policy configuration with the AV module 809, VPN aspects of a policy configuration with the VPN module 811, and license compliance aspects of a policy configuration with the license compliance module 813. Various implementations may pass different degrees of functionality between the PCIA to modules. In one embodiment, a plug-in API enables a PCIA to implement certain aspects of a policy configuration with a given module and enables the module to provide a configuration status report for the given module to the PCIA. The PCIA then integrates the configuration status report from the given module with configuration status reports from other modules into a single generalized configuration status report to be transmitted to a PDEA and/or a policy coordinator, a single detailed configuration status report to be transmitted to a PDEA and/or a policy coordinator, or transmit the different configuration status reports to a PDEA and/or policy coordinator. In another embodiment of the invention, the PCIA 801 solicits data from modules via the plug-in APIs 815A-815C to generate a configuration status report.

Figure 9:
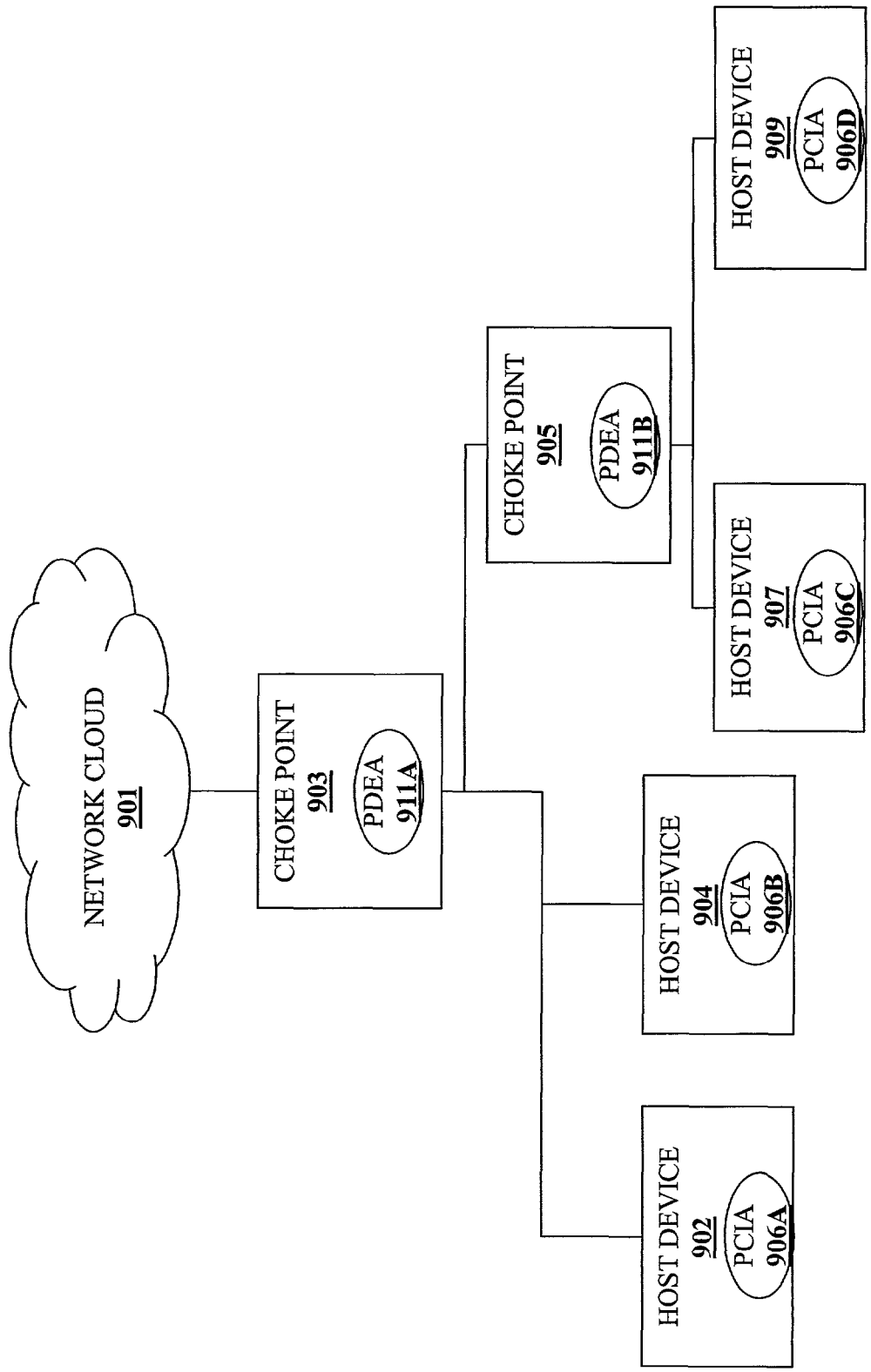
FIG. 9 is an exemplary diagram of a network with hierarchical PDEAs according to one embodiment of the invention.

FIG. 9 is an exemplary diagram of a network with hierarchical PDEAs according to one embodiment of the invention. In FIG. 9, a choke point 903 is coupled with a network cloud 901. The choke point 903 is coupled with a choke point 905, a host device 902, and a host device 904. The choke point 905 is coupled with a host device 907 and a host device 909. The choke points 903 and 905 respectively have PDEAs 911A and 911B. The host devices 902, 904, 907, and 909 respectively have PCIAs 906A-906D. A network may be structured with hierarchical PDEAs in order to provide flexibility to an organization. For example, an organization may want to enforce a less restrictive policy definition on the host devices 902 and 904 and a more restrictive policy definition on the host devices 907 and 909. The more restrictive policy definition is enforced by the PDEA 911B while the less restrictive policy definition is enforced with the PDEA 911A. Hence, the host devices 907 and 909 must comply with both policy definitions while the host devices 902 and 904 must only comply with the policy definition enforced by the PDEA 911A. In addition, an organization may enforce different policy definitions regardless of the degree of restriction. The PDEA 911B may enforce one policy definition on the host devices 907 and 909. The PDEA 911A enforces a different policy definition on the host devices 902 and 904, but does not enforce the different policy definition on the host devices 907 and 909 because they are on the PDEA's 911A exclusion list.

Organizing PDEAs in a hierarchical manner increases flexibility of an organization's network policy. The organization can enforce policy definitions of varying levels of restriction to its network. In addition, an organization can enforce different policy definitions.

Figure 10:
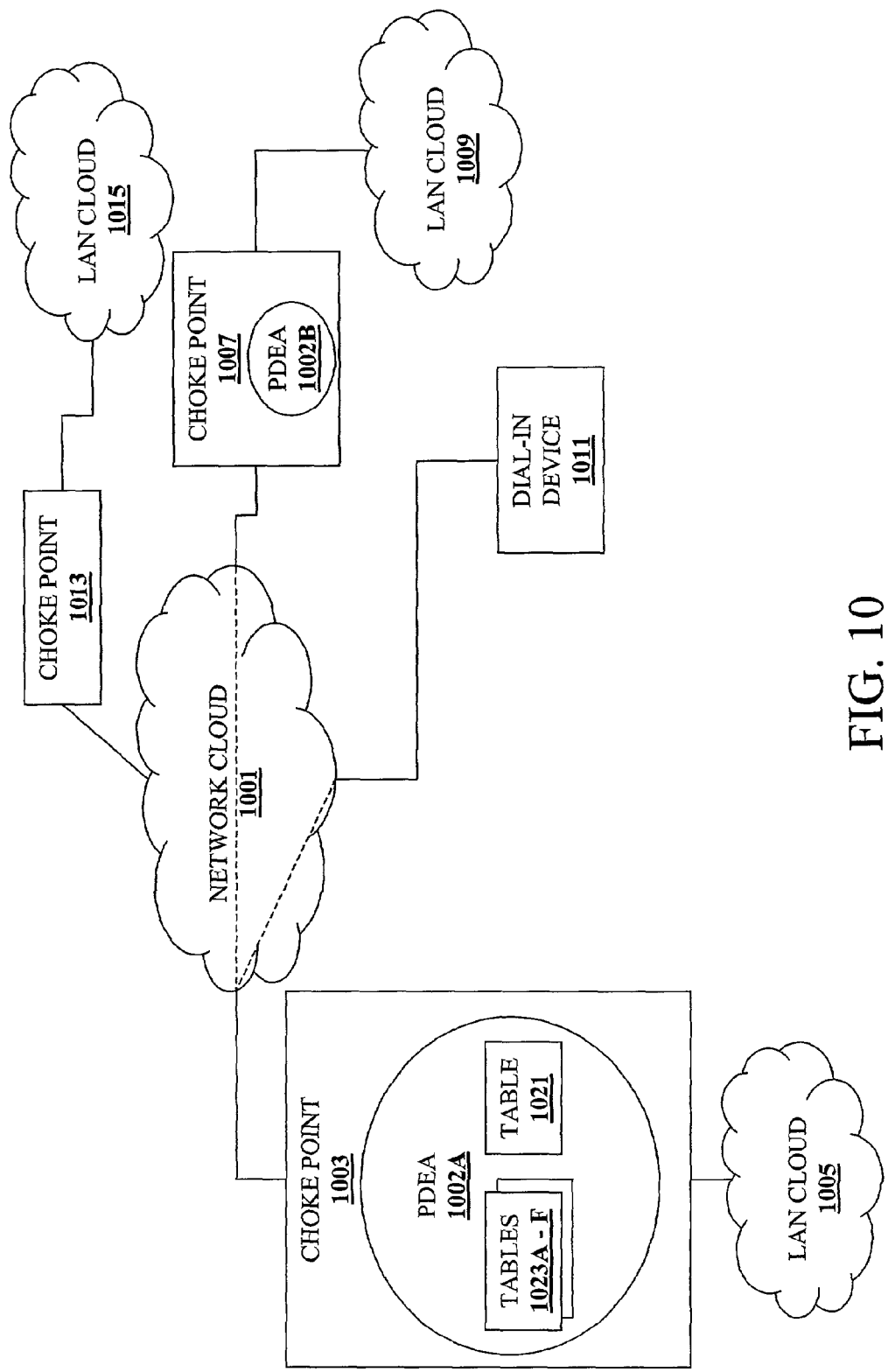
FIG. 10 is an exemplary diagram of a virtual private network according to one embodiment of the invention.

FIG. 10 is an exemplary diagram of a virtual private network according to one embodiment of the invention. A policy definition may relate to virtual private networks (VPNs). In FIG. 10, a choke point 1003 is coupled with a network cloud 1001. The network cloud 1001 is coupled with a choke point 1013, a choke point 1007, and a dial-in device (e.g. a laptop) 1011. The choke point 1003 is also coupled with a LAN cloud 1005.

The choke point 1013 is coupled with a LAN cloud 1015. Host devices within the LAN cloud 1015 seek to access to the LAN cloud 1005 via the choke points 1013 and 1003. The choke point 1007 is coupled with a LAN cloud 1009. The choke point 1003 monitors VPN traffic from the LAN cloud 1015, the LAN cloud 1009, and the dial-in device 1011 differently. Since the choke point 1013 does not have a PDEA, the PDEA maintains individual tables for each host device within the LAN cloud 1015 accessing the LAN cloud 1005. Tables 1023A-1023F may record traffic outgoing from the LAN cloud 1005 to each host device within the LAN cloud 1015 and only permit incoming traffic that is responsive to outgoing traffic. Alternatively, the tables 1023A-1023F may record incoming traffic from each of the host devices within the LAN cloud 1015 and block traffic from certain of the host devices that violates certain criteria.

Since the choke point 1007 has a PDEA 1002B, the PDEA 1002A allows traffic to flow between the LAN clouds 1009 and 1015 in accordance with its policy definition. Likewise, the PDEA 1002B allows traffic to flow between the LAN clouds 1009 and 1015 in accordance with its policy definition, which may or may not be the same as PDEA's 1002A policy definition. Either one or both of the PDEAs 1002A and 1002B may maintain tables to monitor VPN traffic between the clouds 1005 and 1009 in accordance with their respective policy definitions.

The dial-in device 1011 dials into the LAN cloud 1005. The dial-in device 1011 accesses the LAN cloud 1005 via the choke point 1003. The PDEA 1002A monitors the traffic from the dialing device 1011 with a table 1021. The PDEA 1002A may force the dial-in device 1011 to install a PCIA in order to access the LAN cloud 1005. If the PDEA 1002A allows the dial-in device 1011 to access the LAN cloud 1005, the PDEA 1005 will maintain a table 1021 to monitor traffic from the dial-in device 1011. The table can be used to monitor traffic from the dial-in device with different techniques. The PDEA 1002A may record outgoing traffic from the LAN cloud 1005 to the dial-in device in the table 1021 and only allow responsive traffic from the dial-in device. Alternatively, the PDEA 1002A may record ingress traffic from the dial-in device 1011. The PDEA 1002A may record ingress and egress traffic to the dial-in device 1011. The PDEA 1002A may allow all ingress traffic from the dial-in device that is confirmed as originating from the dial-in device and block any traffic from a device passing traffic through the dial-in device.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

We claim:
1. A method comprising:
centrally maintaining a plurality of policy definitions for one or more subscribers;
generating policy configurations using the plurality of policy definitions, each of the policy configurations being specific to one of the plurality of policy definitions, wherein each of the policy configurations defines a required software configuration;
disseminating the policy configurations to one or more host devices within the subscribers' networks;

determining at each of said one or more host devices if that host device complies with the required software configuration defined by the appropriate one of the policy configurations, wherein said determining includes scanning a registry of that host device;

transmitting by each of said one or more host devices a configuration status indicating whether it complies with the appropriate one of the policy configurations; and restricting at a choke point external access of all packets of those host devices within the subscribers' networks that do not have the appropriate one of the policy configurations and those host devices whose configuration status is not consistent with the appropriate one of the policy configurations, wherein the choke point is a device separate from the host devices.

2. The method of claim 1 further comprising collecting a set of one or more template configurations to generate the policy configurations.

3. The method of claim 1 further comprising:
generating policy configuration identifiers for each of the generated policy configurations; and
disseminating the policy configuration identifiers to the appropriate ones of the subscribers' networks.

4. The method of claim 1 further comprising distributively enforcing the policy definitions on the subscribers' networks.

5. The method of claim 1 further comprising maintaining subscription information for each of the subscribers.

6. The method of claim 1 wherein the set of policy definitions relate to anti-virus protection, license compliance, intrusion detection, content filtering, software maintenance, or virtual private networks.

7. A computer implemented method comprising:
centrally maintaining a plurality of policy definitions for a plurality of subscribers;
collecting a set of template configurations based on a first of the plurality of policy definitions for a first of the plurality of subscribers;
generating a policy configuration with the set of template configurations and a policy configuration identifier that identifies the policy configuration;
transmitting the policy configuration and the policy configuration identifier to an agent on a set of one or more host devices within the first subscriber's network, the policy configuration to include a required software configuration to be present on the set of one or more host devices so as to maintain software, ensure software license compliance, ensure anti-virus protection, and maintain security patches;
transmitting the policy configuration identifier to a policy definition enforcement agent (PDEA) of a choke point corresponding to the set of host devices, wherein the choke point is a device separate from the host devices; and
restricting on a host device basis at the choke point external access of those of the set of host devices that do not provide the policy configuration identifier and an indication of compliance with the first policy definition.

8. The method of claim 7 further comprising maintaining subscription information for the first subscriber.

9. A method comprising:
maintaining a set one or more template configurations;
maintaining a network policy definition for a subscriber;
generating a network policy configuration with the set of template configurations based on the network policy definition and a network policy configuration identifier that identifies the network policy configuration; and transmitting the network policy configuration identifier to a plurality of choke points within a set of one or more local area networks (LANs) of the subscriber;
transmitting the network policy configuration to an agent on a plurality of host devices within the set of LANs to determine compliance of the host devices with a software configuration responsive to the network policy configuration; and
enforcing the network policy definition on the plurality of LANs by restricting at the plurality of choke points external access of those of the plurality of host devices that do not comply with the policy definition, wherein the plurality of choke points are devices separate from the plurality of host devices.

10. The method of claim 9 further comprising:
maintaining status of a subscription corresponding to the subscriber; and
conditioning enforcement of the network policy definition upon the subscriber maintaining the subscription.

11. The method of claim 9 wherein enforcing the policy definition comprises:
each of the choke points
determining if their corresponding host devices have the policy configuration;
determining if their corresponding host devices' configuration status is consistent with the policy configuration; and
restricting external access of those host devices that do not have the policy configuration to accessing the policy configuration; and
restricting external access of those host devices with a configuration status that is inconsistent with the policy configuration to accessing files for implementing the policy configuration.

12. The method of claim 9 wherein the network policy definition concerns anti-virus protection, license compliance, intrusion detection, content filtering, software maintenance, hardware settings, virtual private networks, or any combination of anti-virus protection, license compliance, intrusion detection, content filtering, software maintenance, hardware settings, and virtual private networks.

13. An apparatus comprising:
a policy editor to
receive policy definition parameters from one or more product categories, a plurality of vendors within each product category, and one or more products within each vendor, the one or more product categories including one or more of anti-virus protection and software maintenance, and
generate a policy definition that includes one or more rules to maintain software, to ensure software license compliance, and to maintain security patches from the policy definition parameters, the policy definition to enforce at a choke point in a local area network having a host device, wherein the choke point is a device separate from the host device, and to store the policy definition; and
a policy generator coupled with the policy editor, the policy generator to collect a set of one or more template configurations based on the policy definition and to generate a policy configuration with the set of template configurations to implement on the host device.

14. The apparatus of claim 13 further comprising a template configurations database coupled with the policy generator.

15. The apparatus of claim 13 further comprising:
a subscription editor to receive subscription information; and
a subscription database coupled with the subscription editor and the policy generator, the subscription database to store the subscription information.

16. An apparatus comprising:
a policy editor to
  receive policy definition parameters from a plurality of product categories, one or more vendors within each product category, and one or more products within each vendor, the plurality of product categories including anti-virus protection, and software maintenance, and
  generate policy definitions from the policy definition parameters to enforce software and hardware configurations on a host device at a choke point in a local area network having the host device, wherein the choke point is a device separate from the host device;
a policy definitions database coupled with the policy editor;
a template configurations database to store template configurations; and
a policy generator coupled with the policy definitions database and the template configurations database, the policy generator to generate policy configurations and a policy configuration identifier with the template configuration and the policy definitions to transmit to an agent on the host device.

17. The apparatus of claim 16 further comprising:
a subscription editor to receive subscription information; and
a subscription database coupled with the subscription editor and the policy generator, the subscription database to store the subscription information.

18. The apparatus of claim 17 further comprising the policy generator to generate the policy configurations with the subscription information, the policy definitions, and the template configurations.

19. A system comprising:
a policy coordinator having a policy editor to generate a policy definition from policy definition parameters to enforce software configurations on a host device, and a policy generator to generate a policy configuration and a policy configuration identifier;
a policy definition enforcement agent (PDEA) coupled with the policy coordinator, the PDEA to enforce implementation of the policy definition on the host device; and
a policy configuration implementation agent (PCIA) coupled with the PDEA and the policy coordinator, the PCIA to implement the policy configuration on its host device and to report the policy configuration identifier and configuration status of the host device to the PDEA, the implementation of the policy configuration on its host device includes manipulation of the registry of the host device, wherein the PDEA is separate from the host device.

20. The system of claim 19 wherein the policy coordinator server is a global policy coordinator server that further comprises:
a policy definitions database coupled with the policy editor; and
a template configurations database coupled with the policy generator.

21. The system of claim 20 wherein the global policy coordinator further comprises:
a subscription editor; and
a subscription database.

22. The system of claim 19 wherein the policy coordinator server is a local policy coordinator.

23. The system of claim 19 wherein the PDEA is implemented on a choke point.

24. The system of claim 23 wherein the choke point is a router, gateway, bridge, firewall, modem, virtual private network client, or virtual private network server.

25. A machine-readable medium that provides instructions, which when executed by a set of one or more processors, cause said set of processors to perform operations comprising:
receiving a policy configuration based on a policy definition, the policy configuration to be implemented on a host device in order to comply with the policy definition that has been defined for a local area network that includes the host device;
retrieving a set of one or more files for implementing the policy configuration on the host device if the host device does not have the set of one or more files;
implementing the received policy configurations, wherein implementing includes scanning and manipulating the host device; and
indicating the host device's compliance with the policy definition.

26. The machine-readable medium of claim 25 wherein indicating the host device's compliance comprises:
reporting the host device's configuration status to a policy coordinator, the configuration status indicating whether the host device is consistent with the policy configuration;
receiving an acknowledgement from the policy coordinator; and
communicating the acknowledgement to a policy definition enforcement agent.

27. The machine-readable medium of claim 25 wherein reporting the host device's configuration status comprises:
collecting information from a set of one or more application programming interface (API) plug-ins, each of the set of API plug-ins corresponding to different modules.

28. The machine-readable medium of claim 25 further comprising generating a policy configuration implementation report with the information.

29. The machine-readable medium of claim 28 wherein the different modules include an anti-virus module, a virtual private network module, or a license compliance module.

30. The machine-readable medium of claim 25 wherein indicating the host device's compliance comprises:
identifying the received policy configuration to a policy definition enforcement agent (PDEA); and
reporting the host device's configuration status to the PDEA, the configuration status indicating whether the host device is consistent with the policy configuration.

31. The machine-readable medium of claim 30 wherein reporting the host device's configuration status comprises:
collecting information from a set of one or more application programming interface (API) plug-ins, each of the set of API plug-ins corresponding to different modules.

32. The machine-readable medium of claim 31 further comprising generating a policy configuration implementation report with the information.

33. The machine-readable medium of claim 31 wherein the different modules include an anti-virus module, a virtual private network module, or a license compliance module.

34. The machine-readable medium of claim 25 wherein the policy definition relates to content filtering, software maintenance, security, virtual private networks, license compliance, subscription maintenance or a combination of content filtering, software maintenance, security, license compliance, subscription maintenance, and virtual private networks.

35. A method, comprising:
- receiving policy definitions for different organizations that each have a set of one or more local area networks (LANs), each of the policy definitions including a plurality of product categories, the plurality of product categories including anti-virus protection, intrusion detection, and software maintenance;
- centrally and periodically generating policy configurations and corresponding policy configuration identifiers from current template configurations based upon the policy definitions for each of the different organizations;
- for each of the organizations, disseminating to host devices within that organization's set of LANs the policy configurations generated based on the policy definitions of that organization;
- for each of the organizations, disseminating to choke points within that organization's set of LANs the corresponding policy configuration identifiers, wherein the choke points control external access; and
- ensuring the host devices comply with the policy definitions of their respective organization by,
    - for any of the host devices that do not have the current and appropriate policy configuration or that lack compliance with that policy configuration, restricting at one of the choke points the external access of each such host device to accessing one or more files to bring that host device into compliance, and
    - for any of the host devices that do have the current and appropriate policy configuration and that are compliant with that policy configuration, granting external access.

36. The method of claim 9 wherein said enforcing occurs on said plurality of choke points, wherein the choke points are separate devices from said plurality of host devices.

* * * * *